US008823812B2

(12) United States Patent
Nguyen et al.

(10) Patent No.: US 8,823,812 B2
(45) Date of Patent: Sep. 2, 2014

(54) IMAGE CAPTURING APPARATUS AND METHOD FOR DISPLAYING A SUBJECT OF IMAGE CAPTURING AND INDICATING MOTION OF THE IMAGE CAPTURING APPARATUS DURING THE IMAGE CAPTURING

(75) Inventors: Khang Nguyen, Osaka (JP); Yusuke Monobe, Kyoto (JP); Kozo Ezawa, Osaka (JP); Masahiro Inata, Hyogo (JP); Toshio Inaji, Osaka (JP)

(73) Assignee: Panasonic Intellectual Property Corporation America, Torrance, CA (US)

( * ) Notice: Subject to any disclaimer, the term of this patent is extended or adjusted under 35 U.S.C. 154(b) by 582 days.

(21) Appl. No.: 13/132,656

(22) PCT Filed: Sep. 22, 2010

(86) PCT No.: PCT/JP2010/005726
§ 371 (c)(1),
(2), (4) Date: Jun. 3, 2011

(87) PCT Pub. No.: WO2011/043024
PCT Pub. Date: Apr. 14, 2011

(65) Prior Publication Data
US 2011/0234826 A1 Sep. 29, 2011

(30) Foreign Application Priority Data
Oct. 7, 2009 (JP) ................................ 2009-233290

(51) Int. Cl.
*H04N 5/228* (2006.01)
(52) U.S. Cl.
USPC ...................................... 348/208.6

(58) Field of Classification Search
CPC ................. H04N 5/23248; G03B 5/00; G03B 2205/0007
USPC ........................................................ 348/208.6
See application file for complete search history.

(56) References Cited

U.S. PATENT DOCUMENTS 7,782,362 B2  8/2010 Oshima
7,856,171 B2  12/2010 Bang et al.
(Continued)

FOREIGN PATENT DOCUMENTS

CN  1815297    8/2006
CN  101233746  7/2008
(Continued)

OTHER PUBLICATIONS

International Search Report issued Nov. 9, 2010 in International (PCT) Application No. PCT/JP2010/005726.
(Continued)

*Primary Examiner* — Usman Khan
(74) *Attorney, Agent, or Firm* — Wenderoth, Lind & Ponack, L.L.P.

(57) ABSTRACT

An image capturing apparatus includes: an imaging device which receives incident light through an optical system, and converts the received light into image data of an image; a memory which stores the image data converted; a motion detecting unit which detects a motion of the image capturing apparatus during an exposure period; an image generating unit which generates an image indicating the detected motion; and a display control unit which causes the display unit to display the generated image.

14 Claims, 15 Drawing Sheets

(56) References Cited

U.S. PATENT DOCUMENTS

| | | |
|---|---|---|
| 8,068,141 B2 | 11/2011 | Honjo |
| 2001/0022619 A1 | 9/2001 | Nishiwaki |
| 2005/0057661 A1 | 3/2005 | Tanaka |
| 2006/0170781 A1 | 8/2006 | Sobol |
| 2006/0177207 A1 | 8/2006 | Bang et al. |
| 2007/0097226 A1* | 5/2007 | Shida et al. ............ 348/222.1 |
| 2007/0098381 A1* | 5/2007 | Oshima ..................... 396/52 |
| 2007/0291114 A1 | 12/2007 | Oshima |
| 2009/0225176 A1 | 9/2009 | Honjo |
| 2009/0273683 A1* | 11/2009 | Hoshino ................. 348/208.4 |

FOREIGN PATENT DOCUMENTS

| | | |
|---|---|---|
| EP | 1 137 270 | 9/2001 |
| JP | 2-126253 | 5/1990 |
| JP | 7-110501 | 4/1995 |
| JP | 10-062857 | 3/1998 |
| JP | 10-339898 | 12/1998 |
| JP | 2005-033785 | 2/2005 |
| JP | 2005-109824 | 4/2005 |
| JP | 2006-166396 | 6/2006 |

OTHER PUBLICATIONS

Office Action issued Jan. 2, 2014 in corresponding Chinese Application No. 201080003477.5, with partial English language translation.
Extended Search Report issued Jun. 6, 2014 in corresponding European Application No. 10821702.7.

* cited by examiner

FIG. 13

| Exposure period | Not displayed (Conventional example) | Displayed (Image capturing apparatus) | Effect of reducing camera-shake blur |
|---|---|---|---|
| 1/3.75 sec | Amount of camera-shake blur<br>Horizontal: 15<br>Vertical: 7 | Amount of camera-shake blur<br>Horizontal: 1<br>Vertical: 2 | Horizontal: 15−1 = 14<br>Vertical: 7−2 = 5 |
| 1/3 sec | Amount of camera-shake blur<br>Horizontal: 21<br>Vertical: 10 | Amount of camera-shake blur<br>Horizontal: 2<br>Vertical: 2 | Horizontal: 21−2 = 19<br>Vertical: 10−2 = 8 |
| 1/2 sec | Amount of camera-shake blur<br>Horizontal: 29<br>Vertical: 13 | Amount of camera-shake blur<br>Horizontal: 6<br>Vertical: 6 | Horizontal: 29−6 = 23<br>Vertical: 13−6 = 7 |

IMAGE CAPTURING APPARATUS AND METHOD FOR DISPLAYING A SUBJECT OF IMAGE CAPTURING AND INDICATING MOTION OF THE IMAGE CAPTURING APPARATUS DURING THE IMAGE CAPTURING

TECHNICAL FIELD

The present invention relates to an image capturing apparatus and a method for displaying a subject and indicating motion of the image capturing apparatus during image capturing.

BACKGROUND ART

Along with development in enhancing resolution of cameras and miniaturizing imaging devices, it has become difficult to ensure a sufficient exposure amount at the time of image capturing. When the image capturing is performed in a dark environment, an exposure time is extended to ensure a sufficient amount of light. With this, there is the problem of camera-shake blur becoming greater during the exposure time (exposure period).

Examples of camera-shake blur correction techniques for cameras include optical or electronic camera-shake blur correction techniques. However, there is also a problem that, as it stands now, when an amount of camera-shake blur is large, the blur cannot be corrected, or when the blur is excessively corrected, image quality deteriorates. Thus, it is necessary to control the amount of camera-shake blur so as to obtain good images.

Conventionally, there is a camera which prompts a user to suppress camera-shake blur so as to perform image capturing in a stable condition with little camera-shake blur, by notifying the user of a state of the camera shake prior to image capturing (before a start of an exposure period).

Examples of such a camera include a camera which stores an image capturing condition at a time when camera shake occurs and compares a current image capturing condition with the stored image capturing condition. When the current image capturing condition matches the stored past condition at the time when the camera shake occurred, the camera determines a possibility of camera-shake blur and alerts the user (refer to Patent Literature 1, for instance).

Moreover, there is the technique of obtaining information from a motion detection sensor and generating a time series graph depicting a state of camera shake prior to image capturing (before a start of an exposure period). In addition, there is a camera which displays, on a screen, a time series graph depicting a state of camera shake together with a through image and allows a user to recognize the state of the camera shake of the camera (refer to Patent Literature 2, for example).

CITATION LIST

Patent Literature

[PTL 1]
  Japanese Unexamined Patent Application Publication No. 2005-109824
[PTL 2]
  Japanese Unexamined Patent Application Publication No. 2006-166396

SUMMARY OF INVENTION

Technical Problem

However, since Patent Literature 1 compares the current image capturing condition with the past image capturing condition at the time when the camera shake occurred, when past data is insufficient, even an image capturing condition in which camera-shake blur occurs is not notified to the user. Moreover, there has been a problem that, in response to notification, the user can stabilize the camera prior to image capturing (before a start of an exposure period), by changing a manner of holding the camera, but it is not possible to prevent camera shake during the image capturing (camera shake during the exposure period). In addition, there has been a problem that a memory is necessary for storing data, which increases costs.

Moreover, Patent Literature 2 displays a degree of time-series camera-shake blur prior to image capturing (before a start of an exposure period), and thus allows the user to voluntarily stabilize the camera. However, there has been a problem that image signals are not output from imaging devices and nothing is displayed during exposure (during the exposure period), and thus the user cannot check a subject during image capturing.

Both Patent Literature 1 and Patent Literature 2 disclose notifying the user of the state of the camera shake prior to the image capturing (refer to the second row and the second column (operation during a period prior to exposure $1x$ in the conventional example in FIG. 16)), and allowing the user to voluntarily stabilize the camera. However, image blur actually occurs during exposure (refer to the third row and the second column). For this reason, there has been a problem that, even if the camera shake does not occur prior to the image capturing (before the start of the exposure period), when an exposure time is long during exposure (a case of performing image capturing in a dark environment such as a room for a birthday party, which has been desired in recent years), it is not possible to prevent the camera shake during exposure.

The present invention has been devised to solve the above conventional problems, and makes it possible to check a degree of camera shake even in the case of long exposure (a case where an exposure period is long). The present invention prevents the camera shake during exposure by allowing the user to voluntarily suppress the camera shake. Moreover, the present invention has an object to provide an image capturing apparatus and an image capturing method which make it possible to successfully perform camera-shake blur correction processing, which is described later, by allowing the user to voluntarily control an amount of camera shake during exposure, and to obtain a high-quality image.

In other words, the present invention has an object to provide the image capturing apparatus or the like which does not cause the (significant) camera shake during the exposure period even if the exposure period is long, and prevents deterioration in image quality caused by the camera-shake blur during the exposure period.

Solution to Problem

In order to solve the above problems, an image capturing apparatus according to an aspect of the present invention is an image capturing apparatus including: an optical system; an imaging device which receives incident light through the optical system, and converts the received light into image data of an image formed by the light; a memory which stores the image data converted and output from the imaging device (by the imaging device); a display unit configured to display an image (display image); a motion detecting unit configured to detect motion information indicating a motion of the image capturing apparatus during an exposure period; an image generating unit configured to generate an image indicating the motion of the image capturing apparatus during the exposure period which is indicated by the motion information detected by the motion detecting unit; and a display control unit configured to cause the display unit to display (during the exposure period) the generated image as the image that is to be displayed.

With this, the image indicating the motion of the image capturing apparatus is generated during the exposure period when no image is output from the imaging device, based on the motion information detected by the motion detecting unit. The generated image is displayed to a user, and the user seeing the image can check the motion of the image capturing apparatus caused by camera shake, and voluntarily stabilize the image capturing apparatus. Stabilizing the image capturing apparatus as above prevents camera-shake blur.

In other words, although the exposure period is long (e.g., longer than $1/3.75$ seconds shown in the second row in FIG. 13), the image capturing apparatus includes the above elements and makes it possible to reduce camera shake blur by avoiding an increase in the camera shake during the exposure period, thereby enhancing image quality.

It is to be noted that displaying a through image simulatively or indicating appropriate information (image) such as the motion information of the image capturing apparatus makes it possible to enhance the image quality.

Moreover, it is preferred that the image generating unit is configured to generate a position-corrected image by correcting a position in the image indicated by the image data, according to the motion indicated by the motion information detected by the motion detecting unit, the image data being output from the imaging device just prior to a start of exposure and stored in the memory, and that the display control unit is configured to cause the display unit to display the generated position-corrected image.

With this, the through image is simulatively displayed to the user during exposure, and the user seeing the simulatively displayed through image can check a subject and voluntarily stabilize the image capturing apparatus, thereby preventing the camera-shake blur in an image.

Moreover, it is preferred that the image generating unit is configured to generate the image indicating a degree of motion of the image capturing apparatus, based on the motion information detected by the motion detecting unit, and that the display control unit is configured to cause the display unit to display the generated image indicating the degree of motion.

More specifically, the generated image indicating the degree of motion is, for instance, an image indicating a trajectory of the motion of said image capturing apparatus.

It is to be noted that, for example, an image indicating the trajectory of the motion may be displayed during exposure (during the exposure period).

With this, the user can check the motion trajectory (the trajectory of the motion) of the image capturing apparatus during exposure, and prevent the camera-shake blur by voluntarily stabilizing the image capturing apparatus.

More specifically, the generated image indicating the degree of motion is, for instance, an image indicating a direction and an amount of the motion of the image capturing apparatus (with an arrow or the like).

With this, the user can accurately understand the direction and the amount of the motion of the image capturing apparatus during exposure and voluntarily stabilizes the image capturing apparatus, thereby preventing the camera-shake blur.

Moreover, it is preferred that the image generating unit is configured to generate a synthetic image by superimposing the image indicating the motion degree onto a position-corrected image generated by correcting a position in the image indicated by the image data, according to the motion indicated by the motion information detected by the motion detecting unit, the image data being output from the imaging device just prior to a start of exposure (exposure during the exposure period) and stored in the memory, and that the display control unit is configured to cause the display unit to display the generated synthetic image.

It is to be noted that, more specifically, the generated synthetic image is displayed during exposure.

With this, the user can check the subject while accurately understanding the direction and the amount of the motion of the image capturing apparatus during exposure and voluntarily stabilize the image capturing apparatus, thereby preventing the camera-shake blur.

Moreover, it is preferred that the display control unit is configured to cause said display unit to display, during the exposure period, an enlarged image obtained by enlarging a portion of the image generated by the image generating unit.

With this, even when an amount of the camera shake is large, an imaging device having a size larger than a size of an image actually captured is not required, and costs can be reduced. In addition, displaying the enlarge image permits the user to check even small camera-shake blur, and allowing the user to voluntarily stabilize the image capturing apparatus further increases the effect of preventing the camera-shake blur.

It is to be noted that the motion detecting unit may be an acceleration sensor, an angular speed sensor, or a combination of these. In addition, the motion detecting unit may be a gyro sensor or the like.

Moreover, the display control unit causes the display unit to display the image generated by the image generating unit, during exposure (during the exposure period) or the like.

A display method may be developed which is performed by such an image capturing apparatus and includes: generating an image indicating a motion of an image capturing apparatus during an exposure period which is indicated by motion information that indicates the motion of the image capturing apparatus during the exposure period and is detected by a motion detecting unit (above-mentioned) included in the image capturing apparatus (motion information obtained from the motion detecting unit); and causing a display unit to display the generated image as the image that is to be displayed.

Advantageous Effects of Invention

The image capturing apparatus according to the present invention allows the user to check the subject and the motion of the image capturing apparatus and voluntarily stabilize the image capturing apparatus during exposure, thereby suppressing the camera-shake blur (avoiding the (significant) camera shake during the exposure period) even when exposure is performed for a long time. With this, camera-shake blur correction processing can be satisfactorily performed, thereby obtaining an image having high picture quality.

Although the exposure period is an exposure period (a period longer than $1/3.75$ seconds (refer to FIG. 13) or the like) in image capturing in a dark environment or the like, the image capturing apparatus makes it possible to reduce the camera-shake blur during the exposure period and enhance the image quality. Furthermore, the image capturing apparatus can be simply configured. Moreover, a (simulated) through image is displayed and a display which a user finds easy to follow to reduce the camera shake is made during the exposure period, and thus it is possible to surely reduce the camera shake and surely enhance the image quality. With this, it is possible to combine the simple configuration with the better image quality and surely achieving the better image quality.

BRIEF DESCRIPTION OF DRAWINGS

FIG. 13 is a diagram showing effect according to an embodiment.

DESCRIPTION OF EMBODIMENTS

Figure 1:
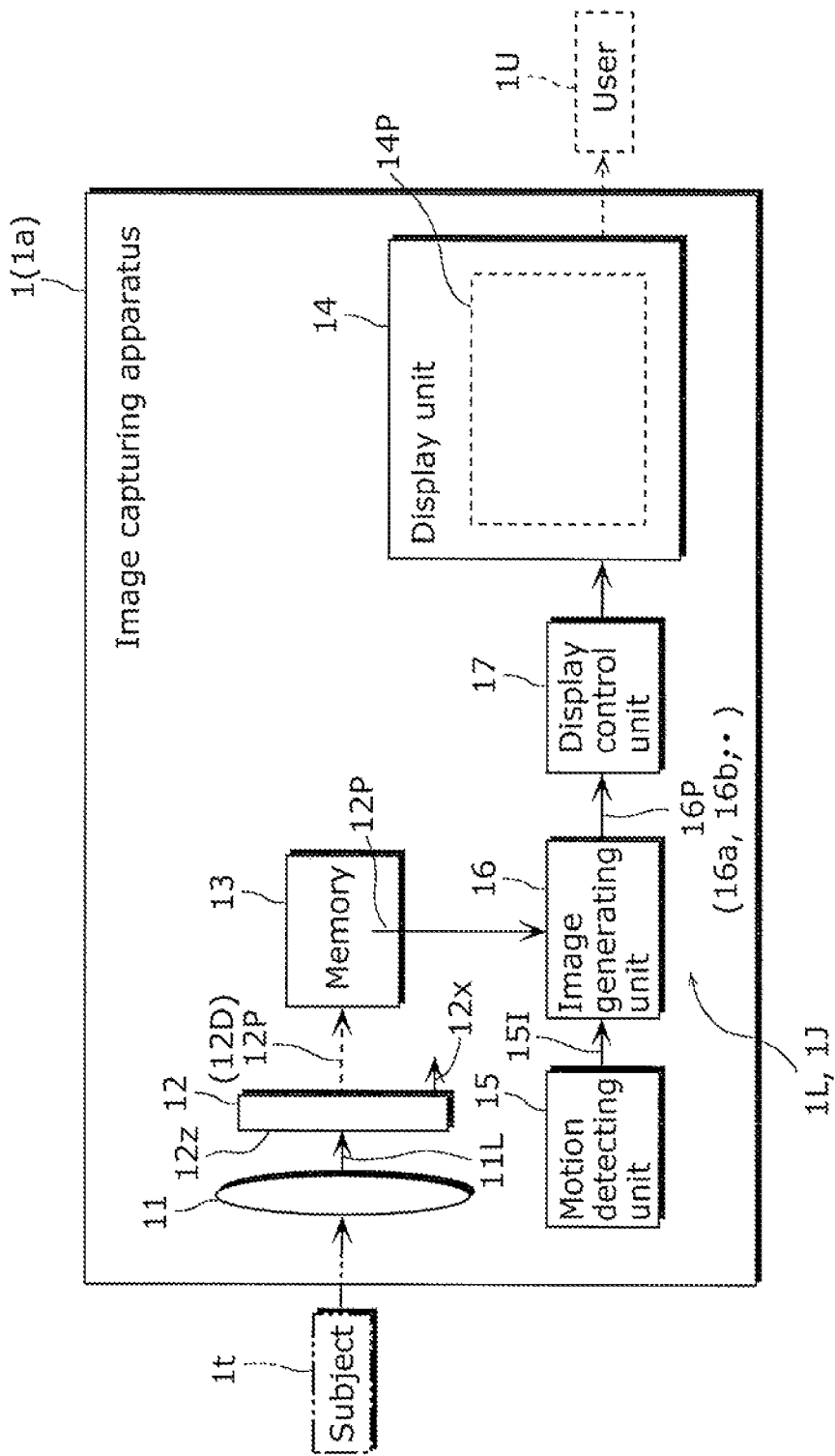
FIG. 1 is a functional configuration diagram of an image capturing apparatus.

The following describes embodiments of the present invention with reference to the drawings.

An image capturing apparatus according to the embodiments (image capturing apparatus 1 in FIG. 1 and so on) includes: an optical system (optical system 11); an imaging device (imaging device 12) which receives incident light (light 11L) through the optical system, and converts the received light into image data (first image data 12D) of an image (first image 12P) formed by the light; a memory (memory 13) which stores the image data (first image data 12D) converted and output from (by) the imaging device; a display unit (display unit 14) which displays an image (image (display image) 14P); a motion detecting unit (motion detecting unit 15) which detects motion information (information 15I in FIG. 1, FIG. 3, and so on) indicating a motion (motion 1My) of the image capturing apparatus during an exposure period (exposure period 1y in FIG. 16 and so on); an image generating unit (image generating unit 16) which generates an image (second image 16P in FIG. 1, FIG. 3, and so on) indicating the motion (motion 1My) of the image capturing apparatus during the exposure period which is indicated by the motion information detected by said motion detecting unit; and a display control unit (display control unit 17) which causes the display unit to display the generated image (second image 16P in FIG. 1, FIG. 3, and so on) as the image that is to be displayed (display image 14P).

Figure 3:
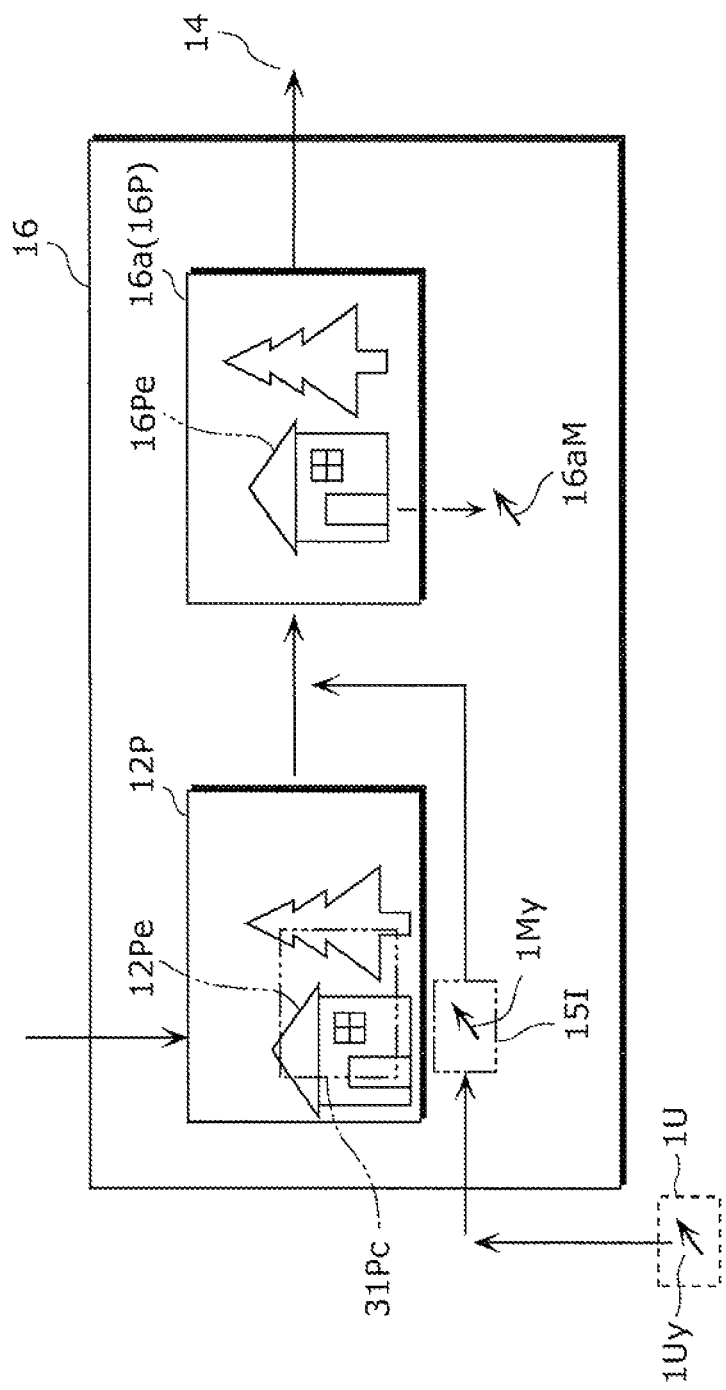
FIG. 3 is a diagram showing a display example.
Figure 16:
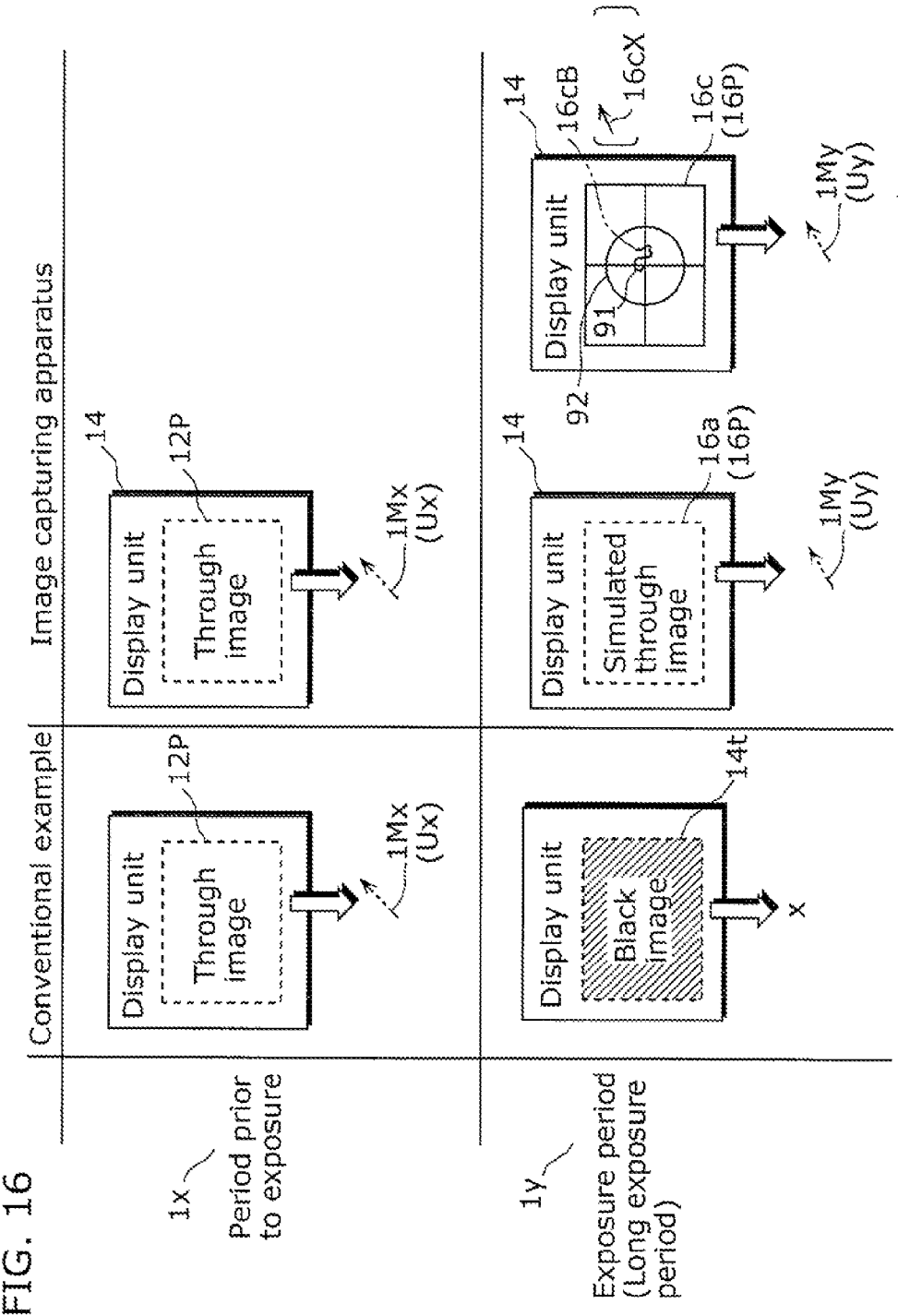
FIG. 16 is a diagram showing operation in a conventional example and operation in the image capturing apparatus.

With this, although the exposure period 1y is long (e.g., a period longer than 1/3.75 seconds shown in the second row in FIG. 13 or the like), the second image 16P indicating a motion 1My of an image capturing apparatus 1a which is caused by camera shake Uy during the exposure period 1y is generated and displayed (refer to the display image 14P in FIGS. 1, 3, and 16, and so on). Thus, the image capturing apparatus (display unit or the like) allows a user 1U (FIG. 1) who sees the displayed second image 16P to reduce the camera shake Uy. Consequently, although the exposure period 1y is long, the camera shake Uy during the exposure period 1y is reduced to avoid (significant) camera-shake blur (refer to the fourth column or the like in FIG. 13), thereby enhancing image quality of an image 12x (FIG. 1, a still image or the like) generated through exposure.

In addition, it is only necessary to display the second image 16P, and complex processing or the like is not required, thereby simplifying a configuration.

Therefore, it is possible to combine the better image quality without camera-shake blur with the simple configuration.

Figure 17:
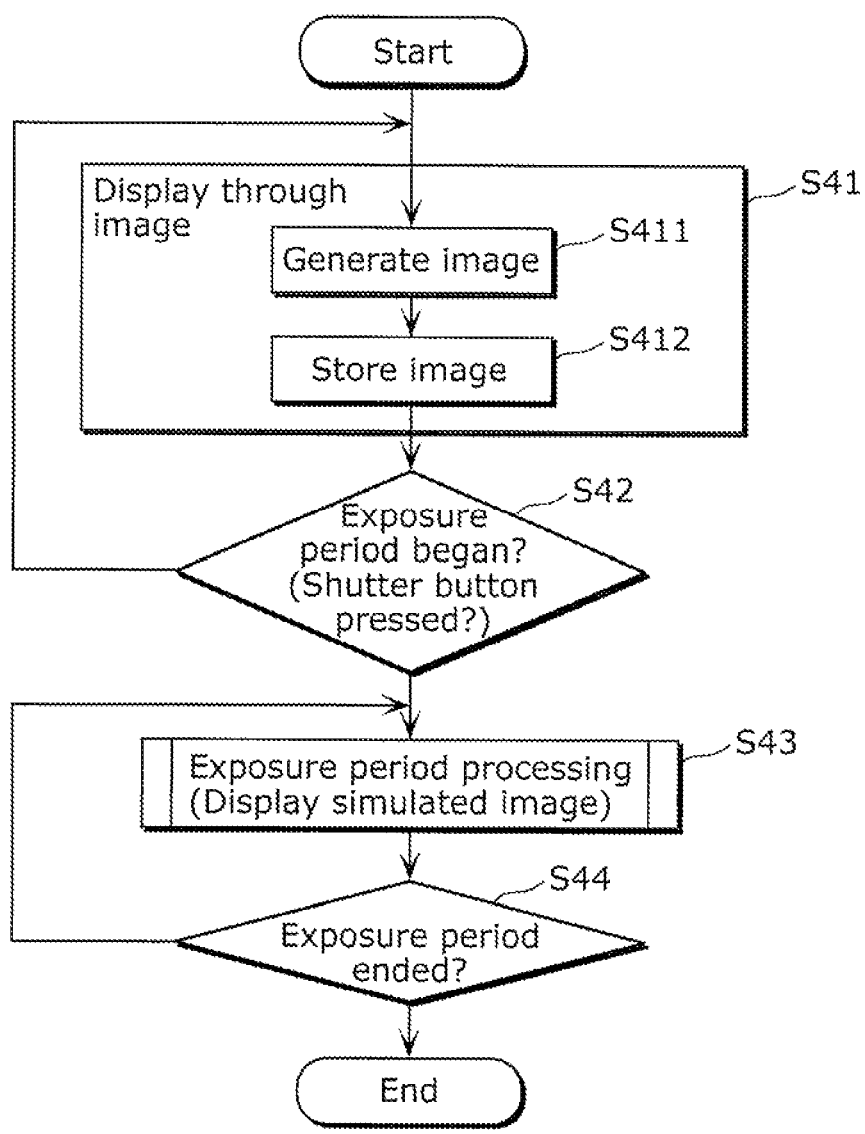
FIG. 17 is a flowchart of processing performed by an image capturing apparatus.

To put it differently, for instance, the exposure period (exposure period 1y in FIG. 16) may be an exposure period in which exposure is started when a shutter button (shutter button 1B in FIG. 18) of the image capturing apparatus is pressed, and may be a period equal to or longer than 1/3.75 seconds (refer to FIG. 13), the imaging device may generate a first image (first image 12P in FIG. 1, FIG. 3, and so on) during a period prior to exposure (period prior to exposure 1x) (the second row in FIG. 16) (S411 in FIG. 17), and not generate the first image during the exposure period (the third row in FIG. 16), the first image being to be displayed as a through image and indicating camera shake (camera shake Ux) caused by a user (user 1U in FIG. 18 and so on) holding the image capturing apparatus, the memory may store the first image generated (first image 12P) during the period prior to exposure (period prior to exposure 1x, the second row in FIG. 16) up to a given time in the exposure period (exposure period 1y, the third row in FIG. 16) (S412 in FIG. 17), the motion detecting unit may detect the motion (motion 1My in FIG. 3, FIG. 16, and so on) of the image capturing apparatus, which is caused by the camera shake (camera shake Uy) of the user during the exposure period (exposure period 1y), after the first image to be stored (first image 12P in FIG. 3 and so on) is generated (S12 in FIG. 2), the image generating unit may generate a second image (second image 16a) by correcting a position (change of position 16aM (FIG. 3), shift, and displacement) in the stored first image (first image 12P in FIG. 3), according to the detected motion (motion 1My) (S13 in FIG. 2), and the display unit may display the camera shake (camera shake Ux) during the period prior to exposure by displaying, during the period prior to exposure (the second row in FIG. 16), the first image generated (first image 12P in FIG. 3, FIG. 16, and so on) as the through image, and to display the camera shake (camera shake Uy) during the exposure period by displaying, also during the exposure period (the third row in FIG. 16), the second image generated (second image 16a in FIG. 3, FIG. 16, and so on) by correcting the position.

In short, the first image 12P is displayed during the period prior to exposure 1x, and thus the through image (image 12z formed by the imaging device 12 (FIG. 18 and so on)) may be displayed.

The display unit may simulatively display the through image (image 12z (estimated to be) formed by the imaging device during the exposure period 1y (FIG. 18 and so on)) also during the exposure period (the third row in FIG. 16) by displaying the second image (second image 16a) during the exposure period.

With this, the simulated through image (second image 16a) is displayed during the exposure period, and thus the camera shake Uy is displayed for the user 1U to more easily understand.

It is to be noted that the phrase "simulatively display" means not displaying an original (regular) through image during the period prior to exposure 1x but displaying, during the exposure period 1y, the second image 16a generated by correcting the position, as a simulated through image.

It is to be noted that when the user sees the simulated through image thus displayed, various known or unknown derivative effects are produced.

Stated differently, for instance, the generated image (second image 16P shown in the third row and the third column in FIG. 16, FIG. 3, FIG. 4, FIGS. 9 to 12, and so on) may be displayed. With this, a distance and a direction (vector 16cX (FIG. 16), a distance and a direction from a position 12Pe shown by a position 16Pe in FIG. 3, and a distance between a starting point 16cA and an end point 16cB and a direction of a trajectory 91 in FIG. 9) may be displayed, and the displayed distance and direction may indicate a direction of the motion 1My or the like of the image capturing apparatus. As a result, the user operates the image capturing apparatus in an appropriate direction or the like corresponding to the indicated direction of the motion 1My or the like, thereby enhancing image quality.

It is to be noted that indicating the motion 1My of the image capturing apparatus may indicate whether or not (significant) motion 1My is present during the exposure period 1y.

With this, for instance, the user judges whether or not image capturing is performed again, based on information about whether image quality of the image 12x generated through exposure is high due to the absence of the motion 1My or low due to the presence of the motion 1My, and thus it is possible to notify the user of appropriate information.

It is to be noted that, for example, the image capturing apparatus displays the camera-shake blur during the entire (substantially entire) exposure period, and thus makes it possible to enhance the image quality.

It is to be noted that, for instance, the image capturing apparatus displays the direction and amount (vector 16cX (FIG. 16)) of the motion of the image capturing apparatus during the exposure period, and thus makes it possible to enhance the image quality.

In contrast, in known conventional examples, image capturing is not performed in such a dark environment and an exposure period is relatively short, and thus the idea of obtaining the above mechanism and effects (e.g., enhancing, sufficiently enhancing, and surely enhancing image quality) using the above-described configuration has not been realized. Therefore, it is considered that the image capturing apparatus includes novelty over the conventional examples.

Embodiment 1

FIG. 1 is a functional configuration diagram showing an image capturing apparatus (image capturing apparatus (camera) 1a) according to Embodiment 1 of the present invention.

The image capturing apparatus according to Embodiment 1 of the present invention displays an image (second image 16P shown in FIG. 3, FIG. 16, and so on) obtained by performing predetermined correction on an image just prior to exposure which is stored in a memory, during exposure. This allows a user to check a subject and motion of the image capturing apparatus and voluntarily stabilize the image capturing apparatus, thereby preventing camera-shake blur. As shown in FIG. 1, an image capturing apparatus 1a includes an optical system 11, an imaging device 12, a memory 13, a display unit 14, a motion detecting unit 15, an image generating unit 16, and a display control unit 17.

The optical system 11 receives light from a subject (e.g., a subject 1t) and forms an image on the imaging device 12.

The imaging device 12 receives incident light through the optical system 11, and converts the light into image data. In other words, for instance, the imaging device 12 may convert the received light into image data (first image data 12D) of an image formed by the light.

The memory 13 stores the image data (a first image 12P and the first image data 12D) output from the imaging device. Here, the imaging device 12 outputs nothing during exposure. In this case, the memory 13 holds an image just prior to exposure until a start of exposure.

The display unit 14 displays a subject captured by the user.

The motion detecting unit 15 detects a motion direction and a motion amount, which are motion information of the image capturing apparatus. Stated differently, for example, the motion detecting unit 15 may detect information 15I defining a motion direction and a motion amount.

The image generating unit 16 generates an image (second image 16P shown in FIG. 3 and so on) showing the motion of the image capturing apparatus, based on the motion information detected by the motion detecting unit 15.

The display control unit 17 causes the display unit 14 to display the image generated by the image generating unit 16. It is to be noted that the display is performed during an exposure period in which the image capturing apparatus performs exposure and the imaging device 12 outputs nothing.

Figure 2:
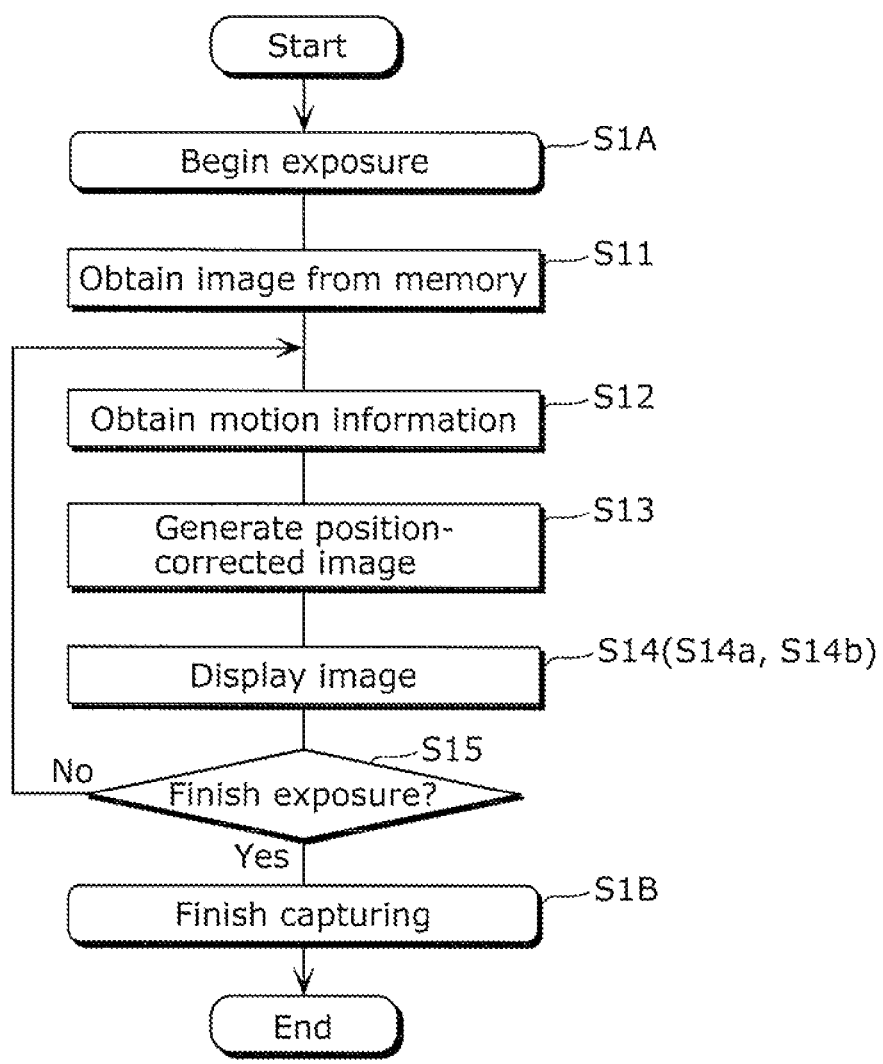
FIG. 2 is a flowchart of an image capturing method.

FIG. 2 is a flowchart according to Embodiment 1 of the present invention.

The image generating unit 16 obtains an image just prior to a start of exposure which is stored in the memory 13, at the start of exposure (e.g., the same time as or a time close to a time at S1A) (S11). The image generating unit 16 also obtains detected motion information from the motion detecting unit 15 (S12). Then, the image generating unit 16 generates a position-corrected image (refer to a second image 16P shown in FIG. 3 and so on) by shifting the image just prior to the start of exposure based on the obtained motion information (S13).

Next, the display control unit 17 causes the display unit 14 to display the position-corrected image (S14). By an end of exposure, the motion information and the position-corrected image are continuously updated and displayed in accordance with a frame rate of the display unit 14 (No in S15, and S12 to S14). To put it differently, for instance, an image is generated at each of times, and an image displayed at the time may be updated to the generated image. This allows a through image (second image 16P) to be simulatively displayed even during the period (during an exposure period) during which the imaging device 12 outputs nothing.

According to the above configuration, even during exposure, the user can check the subject and the motion of the image capturing apparatus and voluntarily stabilize the image capturing apparatus, thereby suppressing the camera-shake blur.

It is to be noted that, in Embodiment 1, the image just prior to the start of exposure is shifted. The resulting position-corrected image may include blank portion. On the other hand, for example, when the shifting is actually performed, the blank portion may not be generated by using an imaging device having a size larger than a size of a captured image.

It is to be noted that, in Embodiment 1, as long as an acceleration sensor, an angular speed sensor, or the like detects the motion of the image capturing apparatus, any one of those may be used as the motion detecting unit 15.

FIG. 3 is a diagram showing a display example in Embodiment 1 of the present invention.

It is to be noted that, in Embodiment 1, as shown in FIG. 3, for instance, displaying the position-corrected image (image 16a (second image 16P)) during exposure allows the user to recognize a state of the camera shake.

Figure 4:
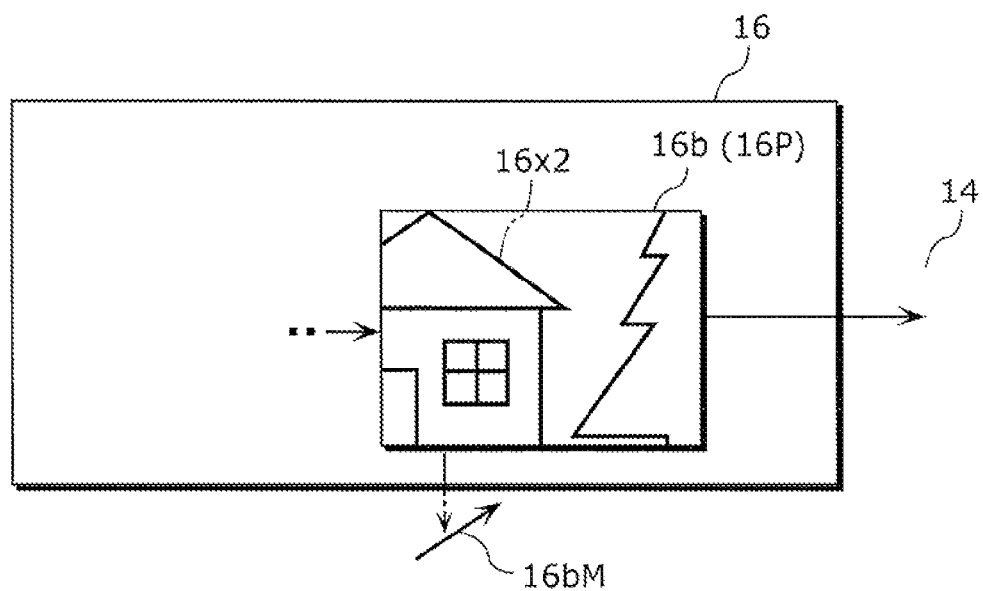
FIG. 4 is a diagram showing an enlarged display example.

FIG. 4 is a diagram showing an enlarged display example in Embodiment 1 of the present invention.

In contrast, as shown in FIG. 4, for example, enlarging the position-corrected image (image 16b) allows the user to better recognize the state of the camera shake. In addition, with the above, the imaging device having the size larger than the size of the captured image that is actually displayed (i.e., an imaging device having a size determined by further adding a size of the above blank portion to a size of the first image 12P (in FIG. 3 and so on)) is not necessary, thereby producing an advantageous effect of cost reduction.

As described above, in sum, for instance, the motion detection is performed during image capturing, and the through image is simulatively generated by processing the image just prior to the start of exposure based on the motion information obtained through the motion detection, and displayed. Consequently, even during the exposure period, the user can check the subject and the degree of motion of the image capturing apparatus and voluntarily stabilize the image capturing apparatus, thereby preventing the camera-shake blur.

Embodiment 2

Figure 5:
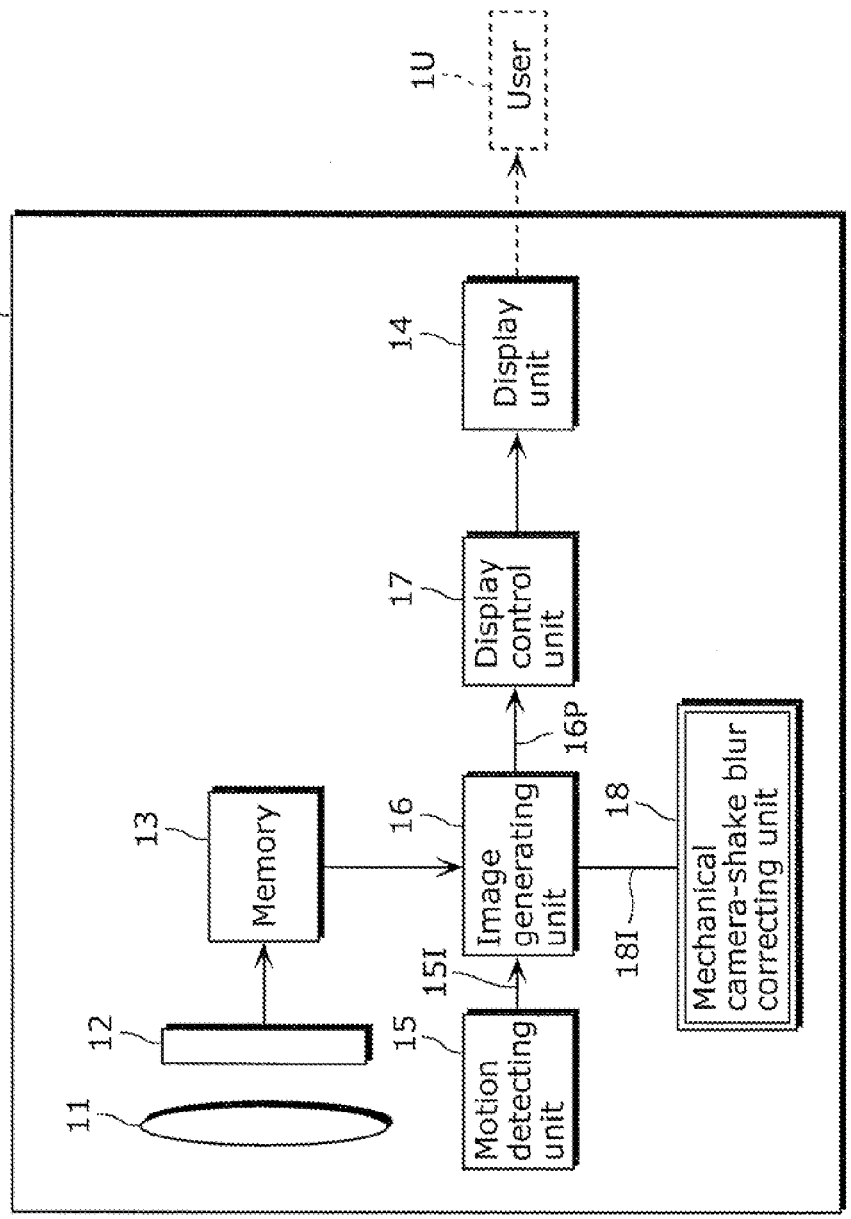
FIG. 5 is a functional configuration diagram of an image capturing apparatus.

FIG. 5 is a functional configuration diagram showing an image capturing apparatus 1b according to Embodiment 2 of the present invention. In FIG. 5, the same numeral signs are used for the same elements as in FIG. 1, and a description of the same elements is omitted.

In FIG. 5, the image capturing apparatus in the present invention further includes a mechanical camera-shake blur correction unit 18. Specific examples of a technique used by the mechanical camera-shake blur correction unit 18 include an optical camera-shake blur correction technique and a sensor shift camera-shake blur correction technique.

Figure 6:
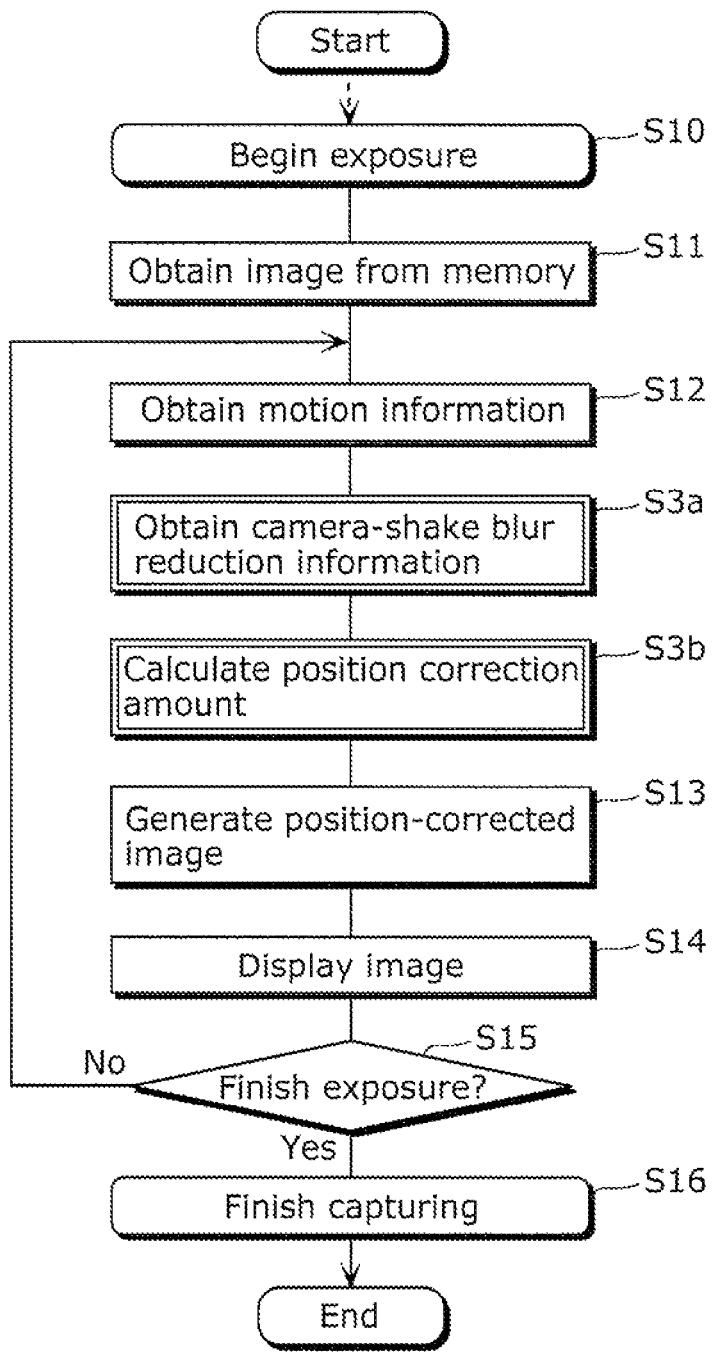
FIG. 6 is a flowchart of an image capturing method.

FIG. 6 is a flowchart according to Embodiment 2 of the present invention.

Figure 14:
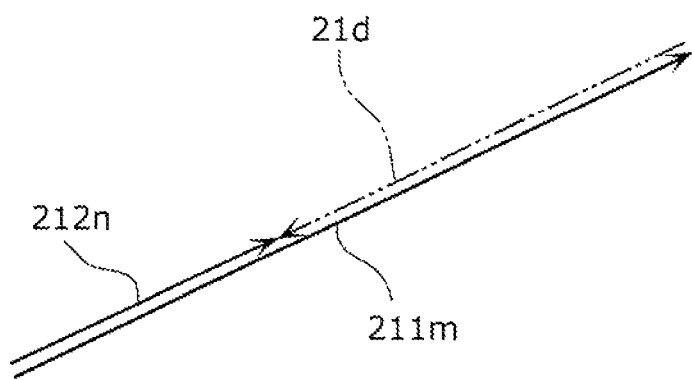
FIG. 14 is a diagram showing camera-shake blur correction processing.

The image generating unit 16 obtains an image just prior to a start of exposure which is stored in the memory 13, at the start of exposure (S11). The image generating unit 16 also obtains detected motion information from the motion detecting unit 15 (S12). In addition, the image generating unit 16 obtains camera-shake blur correction information (information 18I in FIG. 5) from the mechanical camera-shake blur correction unit 18 (S3a). The camera-shake blur correction information includes (or is information or the like including) a correction direction and a correction amount used for mechanical camera-shake blur correction. In other words, for instance, a portion (motion 21d) which is included in a motion 211m (FIG. 14) of the image capturing apparatus 1b and defined by the correction direction and the correction width (amount) indicated by the obtained camera-shake blur correction information may be canceled by correction.

Next, a position correction amount is calculated by subtracting a correction range of the mechanical camera-shake blur correction unit 18 from the motion information of the motion detecting unit 15 (S3b). The image generating unit 16 then generates a position-corrected image (second image 16P) based on the calculated position correction amount (S13). The display control unit 17 then causes the display unit 14 to display the position-corrected image thus generated (S14). By the end of exposure, the motion information, the camera-shake blur correction information, and the position-corrected image are continuously updated in accordance with the frame rate of the display unit 14 and the generated position-corrected image is displayed, and thus the through image can be simulatively displayed even during exposure.

According to the above configuration, even when the mechanical camera-shake blur correction unit 18 is included, an appropriate position-corrected image can be accurately generated.

Stated differently, for example, the second image 16P corresponding to a motion 212n after the motion 21d is canceled through the correction is generated and displayed, which results in more accurate display and helps the user to avoid the camera shake. Consequently, the camera-shake blur is sufficiently reduced.

This way, for instance, a change of position 16aM shown in FIG. 3 may be a change of position for the motion 212n after the cancelation is performed through the correction.

Embodiment 3

Figure 7:
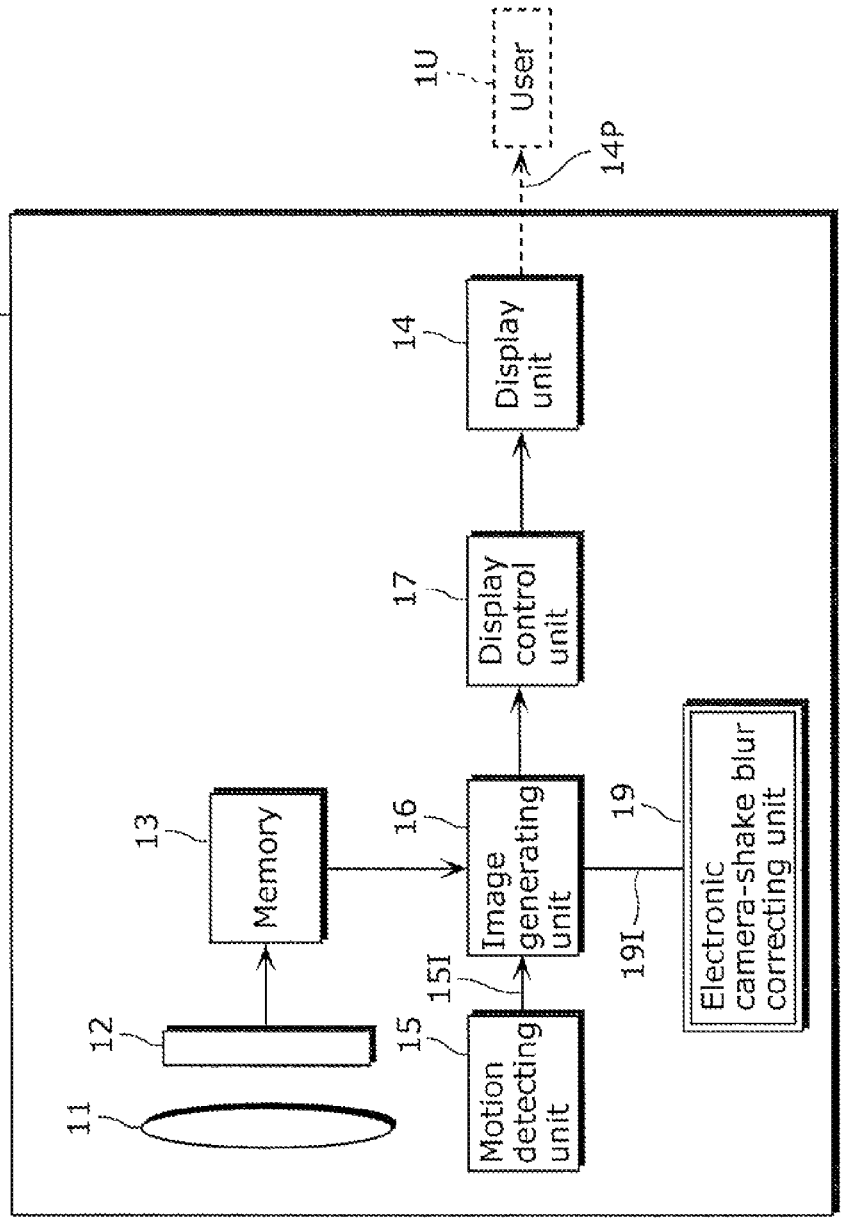
FIG. 7 is a functional configuration diagram of an image capturing apparatus.

FIG. 7 is a functional configuration diagram showing an image capturing apparatus 1c according to Embodiment 3 of the present invention. In FIG. 7, the same numeral signs are used for the same elements as in FIG. 1, and a description of the same elements is omitted.

Figure 8:
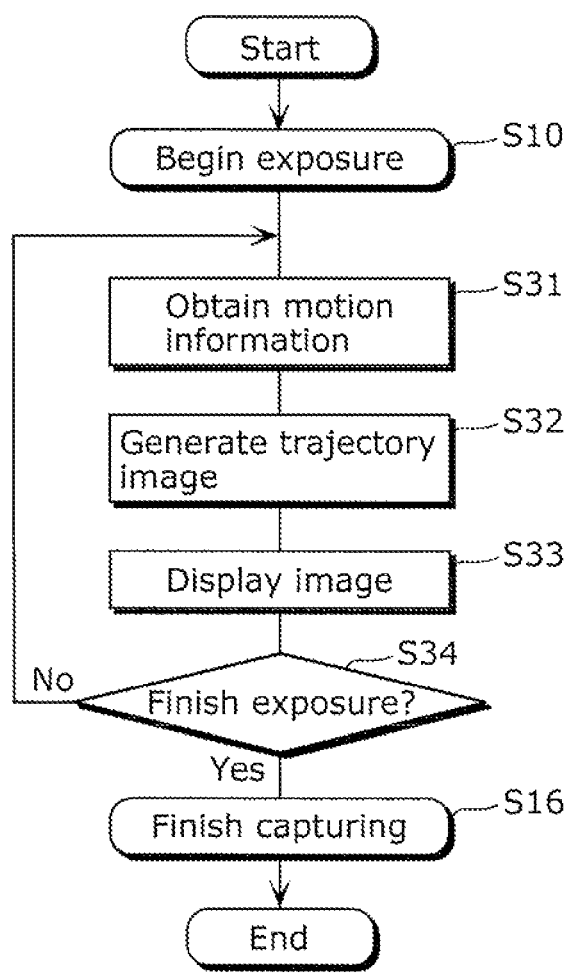
FIG. 8 is a flowchart of an image capturing method.

FIG. 8 is a flowchart according to Embodiment 3.

The image generating unit 16 obtains motion information (information 15I) from the motion detecting unit 15 at a start of exposure (S31). Then, the image generating unit 16 generates a trajectory image (refer to a second image 16c in after-mentioned FIG. 9) of a motion of the image capturing apparatus, based on the motion information (S32). Then, the display control unit 17 causes the display unit 14 to display the trajectory image (S33). By an end of exposure, the motion information and the trajectory image are continuously updated and displayed in accordance with a frame rate of the display unit 14 (No in S34, and S31 to S33), and thus it is possible to display the trajectory of the motion of the image capturing apparatus during exposure.

Figure 9:
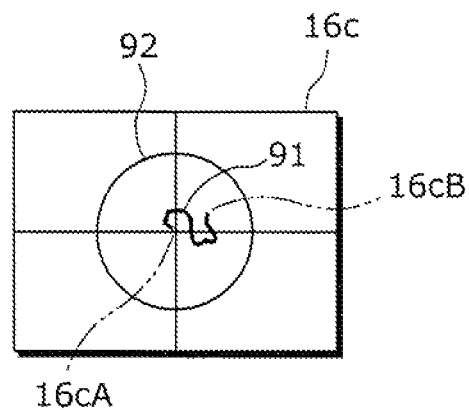
FIG. 9 is a diagram showing a trajectory display example.

FIG. 9 is a diagram showing a trajectory display example in Embodiment 3 of the present invention.

As shown in FIG. 9, the trajectory image (second image 16c and trajectory 91) shows, for example, a trajectory (trajectory 91) of a motion of the image capturing apparatus during exposure, centering around a position of the image capturing apparatus at the start of exposure (the center of the second image 16c indicates the position).

With this, the user can recognize in real time the trajectory (trajectory 91) of the motion of the image capturing apparatus caused by camera shake, voluntarily stabilize the image capturing apparatus, and suppress the camera-shake blur during exposure.

It is to be noted that, to facilitate quantification of a motion amount, a guide line (line 92) such as a circle may be displayed. In other words, a line (arc) 92 indicating the motion of the image capturing apparatus may be shown by a length of a radius from the center (starting point 16cA) of the second image 16c. This way, a motion amount at a portion of the second image 16c is clearly shown by a ratio between the radius and a distance of the portion from the center.

In Embodiment 3, the imaging apparatus 1c further includes an electronic camera-shake blur correction unit 19

(FIG. 7). The electronic camera-shake blur correction unit 19 corrects camera-shake blur in a captured image. It is to be noted that as long as methods make it possible to correct camera-shake blur in one captured image, any of such methods may be used.

Figure 10:
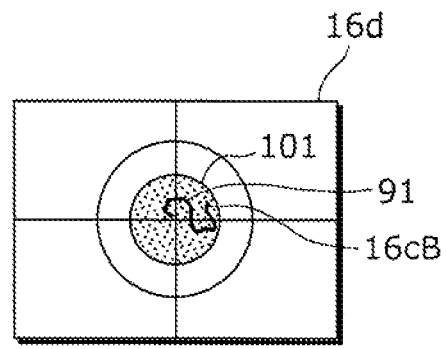
FIG. 10 is a diagram showing a display example of a range where camera-shake blur correction is possible.

FIG. 10 is a diagram showing a display example of a range where camera-shake blur correction is possible in Embodiment 3 of the present invention.

The image generating unit 16 obtains, from the electronic camera-shake blur correction unit 19, a range of camera-shake blur (range information 19I in FIG. 7) within which an image can be (satisfactorily) corrected, and displays, as shown in FIG. 10, a range where correction is possible (range (range where camera-shake blur is possible) 101).

In other words, the image capturing apparatus having an electronic camera-shake blur correction function (electronic camera-shake blur correction unit 19) displays the range where the camera-shake blur can be corrected (range 101), during exposure. This allows the user to stabilize, within the range where the correction is possible, the image capturing apparatus so that the camera-shake blur is suppressed, and to perform image capturing, and thus even in the case of the long exposure (case of performing image capturing in a room for a birthday party or the like), a high-quality image without camera-shake blur can be obtained.

It is to be noted that although the motion trajectory (trajectory 91) of the image capturing apparatus is displayed in Embodiment 3, as long as other display methods make it possible to indicate a motion direction and a motion amount, any of such methods may be used.

Figure 11:
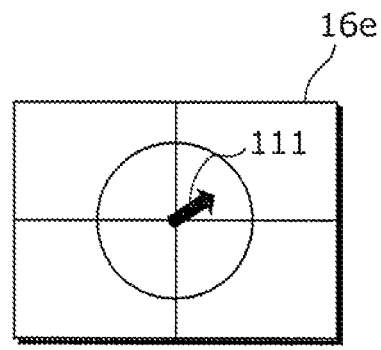
FIG. 11 is a diagram showing a display example of a degree of motion.

FIG. 11 is a diagram showing a display example of a degree of motion in Embodiment 3 of the present invention.

For instance, FIG. 11 shows a motion of an image capturing apparatus with an arrow (arrow 111). A motion direction is indicated by an arrow direction (e.g., an angle of the arrow direction with respect to a predetermined direction (horizontal right-pointing direction in FIG. 11)), and a motion amount is indicated by an arrow length. Updating and displaying (one of or both) the arrow direction and the arrow length based on motion information detected by the motion detecting unit 15 allows the user to recognize the motion of the image capturing apparatus.

Figure 12:
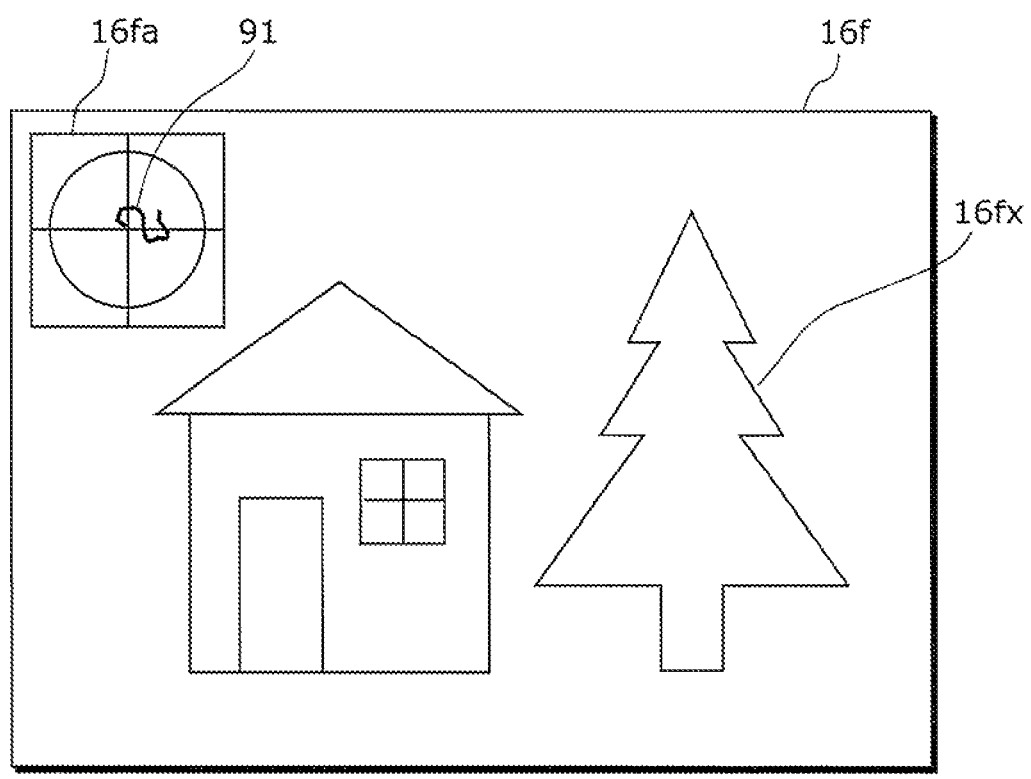
FIG. 12 is a diagram showing an image.

It is to be noted that Embodiment 3 may be combined with Embodiments 1 and 2, and a trajectory or an arrow (refer to the trajectory 91 or the arrow 111) indicating a degree of motion may be displayed together with a simulated through image (refer to FIGS. 3 and 4) (refer to a second image 16f in FIG. 12). In this case, while checking the subject, the user can recognize the quantified motion of the image capturing apparatus caused by the camera shake, and thus it is possible to prevent the camera-shake blur more effectively. Moreover, in this case, a motion information image such as a trajectory may be displayed in a portion of a display region (refer to the top-left corner where an image 16a is shown in FIG. 12; one of a peripheral part and an edge part, one of the four corners, and so on) so that a display of the subject image is not disturbed.

It is to be noted that, more specifically, the imaging device 12 may be, for example, a CCD (charge coupled device) image sensor or the like.

It is to be noted that the motion detecting unit 15 may be a gyro sensor which generates the above-mentioned information 15I (FIG. 1 and so on) or the like.

It is to be noted that the image capturing apparatus is a new image capturing apparatus that has not been manufactured to be available in market.

For this reason, an experiment for simulating operation of the image capturing apparatus with operation of a movie camera has been conducted, and a degree of effectiveness of the image capturing apparatus has been estimated through the experiment.

In the second column in FIG. 13, shown is an amount of camera-shake blur occurring during each of periods (½ seconds in the fourth row, ⅓ seconds in the third row, and so on), when a user is blocked from seeing a moving image displayed on a movie camera (not shown).

Likewise, in the third column, shown is an amount of camera-shake blur occurring during each period, when a moving image is not blocked by the movie camera and is to be seen by the user.

Stated differently, in a conventional example, the displayed moving image is blocked from being seen (the second column), and thus not displaying the second image 16P during an exposure period 1y and displaying a mere black image 14t are simulated.

In the image capturing apparatus, the moving image is not blocked and is to be seen (the third column), and thus not displaying the mere black image 14t and displaying the second image 16P (FIG. 3 and so on) are simulated.

An amount of camera-shake blur of the conventional image capturing apparatus which does not display the second image 16P is estimated based on an amount of camera-shake blur at the time when the displayed moving image is blocked (the second column). An amount of camera-shake blur of the image capturing apparatus which displays the second image 16P is estimated based on an amount of camera-shake blur at the time when the moving image is not blocked (the third column).

As shown in the fourth row and the second column, when the exposure period is ½ seconds, the camera-shake blur in the conventional example is estimated as 29 pixels in a horizontal direction and 13 pixels in a vertical direction.

In contrast, as shown in the fourth row and the third column, when the exposure period is ½ seconds, the camera-shake blur in the image capturing apparatus is estimated as 6 pixels in the horizontal direction and 6 pixels in the vertical direction.

To put it differently, when the exposure period is ½ seconds (the fourth row), it is estimated that the image capturing apparatus makes it possible to reduce the camera-shake blur by 29−6=23 pixels and 13−6=7 pixels in the horizontal direction and the vertical direction, respectively (refer to the fourth column).

Similarly, as shown in the third row, when the exposure period is ⅓ seconds, it is estimated that the image capturing apparatus makes it possible to reduce the camera-shake blur by 21−2=19 pixels and 10−2=8 pixels in the horizontal direction and the vertical direction, respectively.

It is to be noted that when the exposure period is shorter than ⅓ seconds (e.g., when the exposure period is ⅓.75 seconds shown in the second row), it is confirmed that the camera-shake blur can be reduced to some extent.

Stated differently, the exposure period may be, for instance, ⅓ seconds or shorter than ⅓ seconds.

It is to be noted that, as shown in the second row, the exposure period may be, for instance, ⅓.75 seconds.

The experiment has predicted that the minimum value of reduction in the camera-shake blur in the image capturing apparatus is equal to or greater than 5 pixels (refer to, for instance, the reduction in the vertical direction (5 pixels) during the exposure period of ⅓.75 seconds (the second row and the fourth column) in FIG. 13). In addition, the experiment has predicted that the maximum value of the reduction is equal to or greater than 23 pixels (refer to, for example, the reduction in the horizontal direction (23 pixels) during the exposure period of ½ seconds (the fourth row and the fourth column)).

As stated above, the experiment has predicted that the reduction in the camera-shake blur can be relatively increased.

It is to be noted that the operation indicated below may be performed in the above manner in a situation. The operation is merely an example.

The imaging device 12 provided in a camera 1 (image capturing apparatus) (FIG. 1) may generate the first image 12P (FIGS. 1, 3, 16, and so on) indicating camera shake Ux during the period prior to exposure 1x (FIG. 16) which is previous to the exposure period 1y (FIG. 16) in which an image 12x (FIG. 1, and so on) is generated through exposure, and may not generate the first image 12P during the exposure period 1y.

The generated first image 12P is displayed during the period prior to exposure 1x, and thus the camera shake Ux during the period prior to exposure 1x may be displayed (refer to the second row in FIG. 16).

The generated first image 12P may be stored until the exposure period 1y (the memory 13, S412).

A motion 1My (FIGS. 3, 16, 18, and so on) of the camera 1 (image capturing apparatus) resulting from the camera shake Uy (FIGS. 13, 16, and so on) during the exposure period 1y may be detected during the exposure period 1y (the motion detecting unit 15, and S12 in FIG. 12).

The second image 16P may be generated by adding, to the stored first image 12P, a change 16aM (change of position) (FIG. 3, and so on) by the detected motion 1My (by changing a position of the first image 12P by a direction and a distance of the change 16aM) (the image generating unit 16, and S13).

The generated second image 16P is displayed (as the image (display image) 14P (FIG. 1)) for the user, and thus the camera shake Uy (FIGS. 3, 16, and so on) during the exposure period 1y, which is the basis of the change 16aM (FIG. 3) added to the displayed second image 16P, may be displayed (the display unit 14, and FIGS. 1, 2, and so on).

In other words, more specifically, for instance, the first image 12P (FIGS. 1, 3, and so on) is displayed during the period prior to exposure 1x, and thus an image 12z (a through image, FIG. 1, and so on) formed on the imaging device 12 during the period prior to exposure 1x may be displayed.

The second image 16P to which the change 16aM has been added may be displayed during the exposure period 1y (FIGS. 3, 16, and so on), and thus the through image (the image 12z that is (estimated to be) formed (FIG. 1, and so on)) may be simulatively displayed.

With this, the camera shake Uy is displayed during the period prior to exposure 1x, and the user who sees the displayed camera shake Uy is caused to reduce the camera shake Uy (the second row and the third column in FIG. 16). The reduction in the camera shake Uy is not limited to the period prior to exposure 1x.

Stated differently, the second image 16a to which the change 16aM has been added is displayed during the exposure period 1y is displayed during the exposure period 1y (the third row) and the camera shake Uy during the exposure period 1y is displayed, and thus it is possible to reduce the camera shake Uy during the exposure period 1y.

Consequently, it is possible to enhance, through exposure during the exposure period 1y, image quality of the image 12x (FIG. 1 or the like) generated by the imaging device 12.

In other words, it can be considered that the exposure period 1y is a relatively long period (in the immediate future or in the near future) such as a period shown in each row in FIG. 13, because image capturing is performed in a dark environment or the like.

As stated above, despite the long exposure period 1y, the camera 1 in the present invention displays the camera shake Uy during the exposure period 1y, reduces the camera shake Uy during the exposure period 1y, and prevents the deterioration in image quality, thereby enhancing the image quality.

In contrast, in the known conventional example (the second column in FIG. 16), during the exposure period 1y, the mere black image 14t is displayed, but, the camera shake Uy is not displayed. To put it differently, in the conventional example, when the exposure period 1y is a long period in the immediate future (or in the near future), the camera shake Uy is increased and the image quality is deteriorated.

In the image capturing apparatus, elements (the image generating unit 16, the display unit 14, and so on) are combined, and the combination results in a multiplier effect. In contrast, in the conventional example, all or part of the elements are not included, which does not result in the multiplier effect.

The image capturing apparatus has novelty over the conventional example in terms of the configuration, function, and advantageous effect.

Moreover, the image capturing apparatus makes it possible to enhance the image quality only by simply displaying the second image 16P, and to simplify the configuration, because complex processing is not required.

As stated above, the through image is simulatively displayed during the exposure period 1y (refer to the second image 16a in FIGS. 3, 4, and 16) and the camera shake Uy during the exposure period 1y is displayed for the user to easily understand, and thus the camera shake Uy can be surely reduced and the image quality can be surely enhanced.

With this, it is possible to combine the simple configuration with the better image quality and surely achieving the better image quality.

Figure 18:
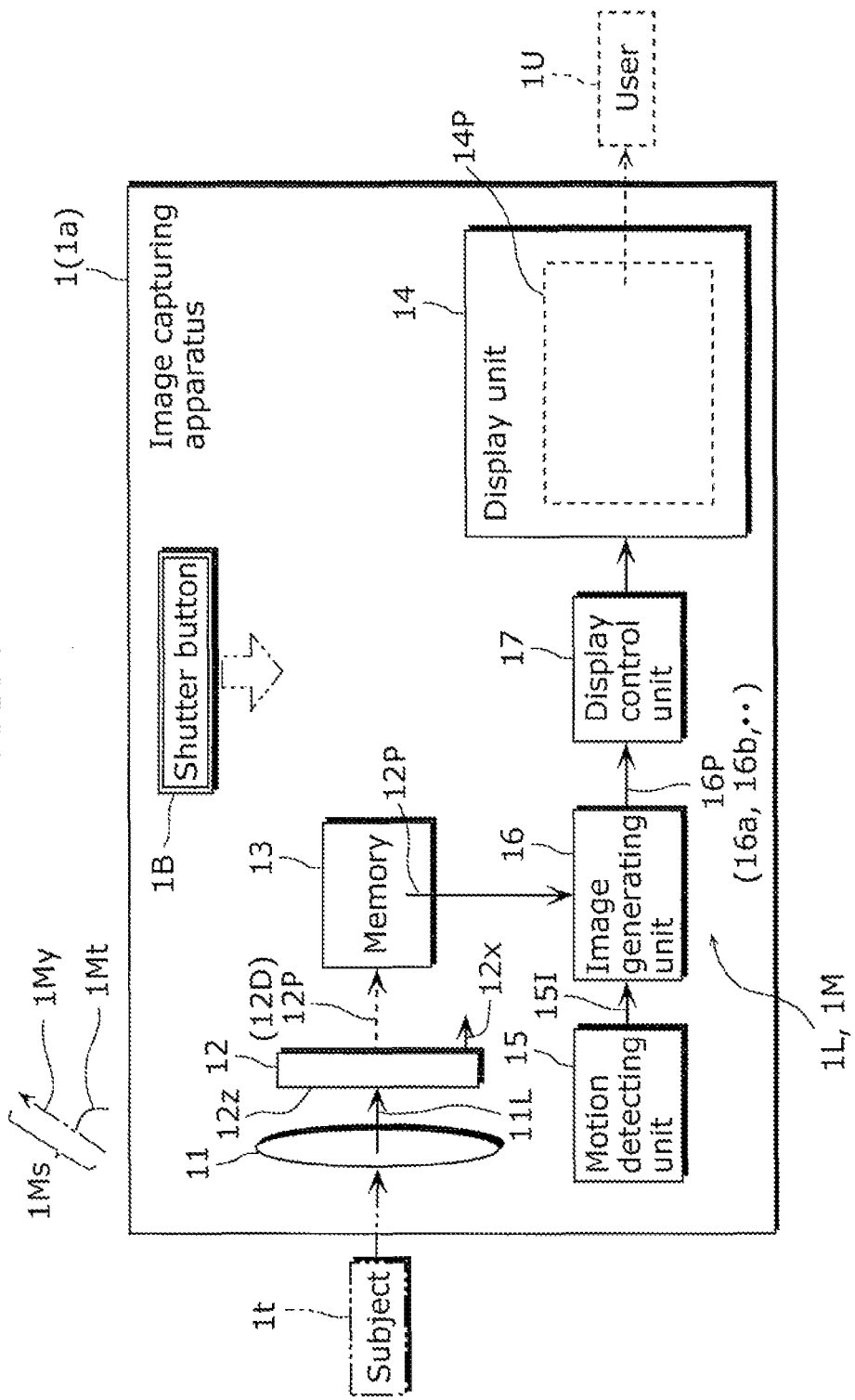
FIG. 18 is a block diagram showing an image capturing apparatus.

It is to be noted that the exposure period 1y is, for instance, a period in which the camera 1 starts exposure when a user 1U presses a shutter button 1B (FIG. 18).

It is to be noted that the change 16aM that is to be added (FIG. 3) is, for example, a change of a position 12Pe before shifting, that is, the position 12Pe in the first image 12P shifted to a position 16Pe by the detected motion 1My.

It is to be noted that the image 12x (FIG. 1) generated through exposure during the exposure period 1y is, for instance, a still image.

It is to be noted that, more specifically, for example, the image 12x may be as follows.

As shown in FIG. 4, for instance, a second image 16b (FIG. 4) may be generated by enlarging a portion 31Pc (FIG. 3) in the first image 12P (FIG. 3), and be displayed.

With this, for example, the second image 16b to which a change 16bM (FIG. 4) obtained by enlarging the change 16aM caused by a motion 1My of a camera 1a resulting from the camera shake Uy during the exposure period 1y may be generated. In other words, the image thus enlarged is displayed, and thus the camera shake Uy may be indicated by the enlarged change 16bM. This way, the camera shake Uy is displayed for the user to easily understand.

Moreover, as shown in FIG. 9, for instance, a second image 16c (FIG. 9) including the trajectory 91 of the motion 1My of the camera 1 (FIGS. 3, 16, 18, and so on) may be generated and displayed during the exposure period 1y. This way, the camera shake Uy may be indicated by the trajectory 91 included in the displayed second image 16c.

More specifically, as shown in FIG. 9, for example, a starting point 16cA of the trajectory 91 indicating that an amount of the camera shake Uy is 0 at a start time of the exposure period 1y may have a central position in the second image 16c (FIG. 9).

An operation by the user 1U for maintaining an end point 16cB of the trajectory 91 at (near) the central position at a current time makes it possible to reduce the camera shake and simplify operation.

Moreover, as shown in FIG. 10, for instance, a second image 16d indicating a range 101 of the camera shake Uy (the motion 1My of the camera 1a) which is predetermined and has few adverse effects may be generated and displayed together with the trajectory 91.

Stated differently, for example, whether or not the adverse effects are few may be displayed for the user depending on whether or not the displayed range 101 includes the current camera shake Uy indicated by the end point 16cB of the displayed trajectory 91.

As stated above, more specifically, for instance, the range 101 may be a range where the electronic camera-shake blur correction unit 19 can appropriately correct the image 12x generated through exposure (or a range narrower than the range).

It is to be noted that although FIG. 10 shows an example where the range 101 is in a circular shape, the range 101 may be in another shape such as a rectangle.

It is to be noted that, as shown in FIG. 12, for example, a second image 16f (FIG. 12) including (i) an image 16fx (FIG. 12) included in the first image 12P (FIG. 3) to which the trajectory 91 (the upper left in FIG. 12) is added (combined) and (ii) the trajectory 91 (image 16fa) may be generated and displayed.

Moreover, as shown in FIG. 11, for instance, a second image 16e including a first arrow 111 indicating an amount and a direction of the camera shake Uy (an amount and a direction of the motion 1My of the camera 1 (FIGS. 3, 16, and so on)) may be generated and displayed.

Figure 15:
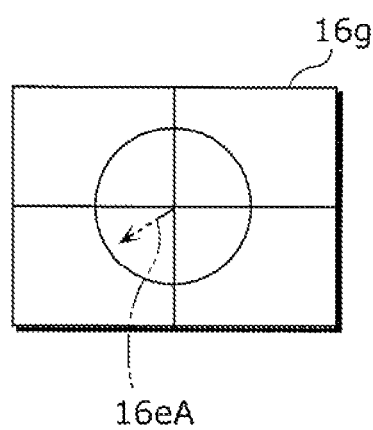
FIG. 15 is a diagram showing an image.

In addition, as shown in FIG. 15, for example, a second image 16g including a second arrow 16eA having a direction opposite to the direction of the camera shake Uy (the direction of the first arrow 111 in FIG. 11) may be generated and displayed.

The second arrow 16eA may be displayed and a direction of a hand motion for reducing the camera shake Uy may be indicated by displaying the direction of the second arrow 16eA opposite to the direction of the camera shake Uy, and thus the user 1U may be prompted to operate in the direction of the motion of the hand motion. This simplifies the operation of the user.

It is to be noted that, more specifically, the second image 16g may include, for instance, both the second arrow 16eA and the first arrow 111 (not shown).

As stated above, when the second image 16P is generated and displayed, for example, the trajectory 91 (the second image 16c in FIG. 9, the second image 16d in FIG. 10, the second image 16f (image 16fa) in FIG. 12, and so on), the range 101 (the second image 16d in FIG. 10, and so on), the first arrow 111 (the second image 16e in FIG. 11, and so on), and the second arrow 16eA (the second image 16g in FIG. 15, and so on) may be displayed.

In addition, for instance, an image (the second image 16f in FIG. 12, and so on) including one or more of the trajectory 91, the range 101, the first arrow 111, the second arrow 16eA, and so on may be displayed as the second image 16P together with the image 16fx (FIG. 12) included in the first image 12P (FIGS. 1 and 3).

It is to be noted that an image not including the image 16fx (FIG. 12) included in the first image 12P (FIGS. 1 and 3) may be generated and displayed as the second image 16P (refer to the second image 16c in FIG. 9, and so on).

It is to be noted that, as stated above, the exposure period 1y is extended in these days.

In other words, for example, in these days, so-called exposure coding camera-shake blur correction processing is used, and thus the exposure period is extended.

In these days, it is often desired to perform image capturing in a darker environment such as an unlighted room for a birthday party, and the image capturing is performed in the darker environment. Thus, the exposure period is further extended.

Moreover, resolution of the imaging device 12 has been enhanced. In other words, for instance, each manufacturer enhances the resolution to compete for specifications. When the resolution is enhanced, the exposure period is further extended.

As stated above, in these days, there is a tendency that the exposure period is further extended. In consideration of such a recent circumstance, the above configuration is derived which makes it possible to enhance the image quality even when the exposure period is long.

In contrast, in the past, the exposure period was relatively short, and it was relatively rare to further extend the exposure period. For this reason, it is considered difficult to derive the above configuration from techniques focusing on only the past circumstances.

It is to be noted that in addition to the above experiment (refer to FIG. 13), an experiment has been further conducted where an image capturing apparatus (refer to the conventional image capturing apparatus in the second column in FIG. 16 and the above-mentioned movie camera, for example) performs image capturing during the exposure period of $1/15$ seconds. The experiment has confirmed that users feel that the exposure period of $1/15$ seconds in image capturing is longer than imagined. In other words, the experiment has confirmed that the exposure period of $1/15$ seconds can be considered as a sufficiently long exposure period to an extent that an operation for suppressing camera-shake blur can be performed during the exposure period.

For instance, the exposure period 1y of the image capturing apparatus 1 may be the period of approximately $1/15$ seconds or a period longer than $1/15$ seconds.

It is to be noted that when the exposure period 1y is the period longer than $1/15$ seconds, it is predicted that a more appropriate operation is relatively easily performed, which is more desirable.

It is to be noted that, for example, the imaging device 12 may generate, for every $1/30$ seconds, one first image 12P during the period prior to exposure 1x.

In addition, for instance, the image generating unit 16 may generate, during the exposure period 1y, one second image 16P at the interval of $1/30$ seconds at which the first image 12P is generated during the period prior to exposure 1x.

Stated differently, for example, during the exposure period 1y, the motion detecting unit 15 performs detection at the interval of $1/30$ seconds that is the same as the interval ($1/30$ seconds) in the period prior to exposure 1x and the one first image 12P is generated based on the detection, and thus the one first image 12P may be generated at $1/30$ seconds.

The exposure period may be, for instance, five times as long as $1/30$ seconds, that is, $1/30$ seconds×5=$5/30$ seconds ($\geq 1/15$). A new second image 16P and five new second images 16P may be generated after each interval of $1/30$ seconds within $5/30$ seconds.

An interval (1/30 seconds) at which the first image 12P is generated and displayed may be the same as an interval (1/30 seconds) at which the second image 16P is generated and displayed.

With this, the interval at which the second image 16P is generated and displayed becomes the same interval (1/30 seconds) and a generation rate and a display rate become the same (1/30 seconds), and thus it is possible to perform display which the user 1U can easily see.

The motion detecting unit may detect, for example, a direction (angle 1Mt in FIG. 18) and an amount (amount 1Ms) of a motion (motion 1My) of the image capturing apparatus.

The image generating unit may generate a position-corrected image (second image 16a) by correcting a position (change 16aM (FIG. 3) and shift) in the image (first image 12P) indicated by the image data (first image data 12D), according to the motion (motion 1My) indicated by the motion information (information 15I in FIG. 1, FIG. 3, and so on) detected by the motion detecting unit, the image data being output from the imaging device just prior to a start of exposure (exposure during the exposure period (exposure period 1y in FIG. 16)) (the period prior to exposure 1x) and stored in the memory, and the display control unit may cause the display unit to display the generated position-corrected image.

The image generating unit may generate the image (one of second images 16c to 16e) indicating a degree of motion (motion 1My) (trajectory 91, end point 16cB of the trajectory 91 (FIGS. 9, 10, and 16), arrow 111 (FIG. 11), vector 16cX (FIG. 16)) of the image capturing apparatus, based on the motion information detected by the motion detecting unit, and the display control unit may cause the display unit to display the generated image (second image 16c or the like) indicating the degree of motion (trajectory 91 or the like, and vector 16cX).

The generated image (second image 16c and 16d in FIGS. 9 and 10) indicating the degree of motion may be an image indicating a trajectory (trajectory 91) of the motion (motion 1My) of said image capturing apparatus.

The generated image (first image 16e in FIG. 11) indicating the degree of motion may be an image (second image 16e having a first arrow 111 indicating the direction and the amount) indicating the direction (angle 1Mt in FIG. 18) and the amount (amount 1My) of the motion (motion 1My in FIG. 18) of said image capturing apparatus.

The image generating unit may generate a synthetic image (second image 16f) by superimposing the image (image 16fa in FIG. 12) indicating the motion degree (trajectory 91 or the like in FIG. 12) onto a position-corrected image (refer to second image 16a (FIG. 3)) generated by correcting a position in the image (first image 12P) indicated by the image data (first image data 12D), according to the motion (motion 1My) indicated by the motion information detected by the motion detecting unit, the image data being output from the imaging device just prior to a start of exposure (period prior to exposure 1x) and stored in the memory, and the display control unit may cause the display unit to display the generated synthetic image (second image 16f).

The display control unit may cause said display unit to display, during the exposure period, an enlarged image (second image 16b in FIG. 4) obtained by enlarging a portion (e.g., portion 31Pc in FIG. 3) of the image (image 12P (FIG. 3)) generated by said image generating unit.

The corrected position (change of position 16aM in FIG. 3) in the first image (first image 12P) may be a position corresponding to a motion remaining (motion 212n in FIG. 14) after a portion (motion 21d in FIG. 14) of the detected motion (motion 211m in FIG. 14), which is corrected through mechanical camera-shake blur correction (mechanical camera-shake blur correction unit 18 in FIG. 5), is subtracted from the detected motion.

With this, the second image 16b to which the change of position 16bM based on more accurate motion is added after the portion to be corrected is subtracted from the motion is generated and displayed, and thus it is possible to more accurately display the camera shake Uy (camera shake caused by motion after motion is subtracted from the motion by the correction).

It is to be noted that, for instance, the above rate during the exposure period may be higher than a rate during the period prior to exposure 1x.

It is to be noted that, for example, an integrated circuit 1L (FIG. 1) including functions of the image generating unit 16 and the display unit 17 may be configured. A computer program for causing a computer 13 (FIG. 1) provided to the image capturing apparatus 1 to execute the functions may be constructed.

It is to be noted that the computer 13 may include part of a CPU (central processing unit) and the like in the image capturing apparatus 1 or the whole image capturing apparatus 1.

Technical matters that are described at places apart from each other, such as embodiments, may be appropriately combined. The present invention also discloses the combined technical matters.

Moreover, an integrated circuit including at least one of the above functions may be configured, a method including at least one of the above steps may be developed, a computer program for causing a computer to execute the at least one function may be constructed, and a data structure of the computer program may be built.

INDUSTRIAL APPLICABILITY

A method for suppressing camera-shake blur of an image capturing apparatus according to the present invention makes it possible to prevent camera-shake blur by allowing a user to voluntarily stabilize the image capturing apparatus by displaying motion information of a subject and/or the image capturing apparatus during exposure. The present invention is useful for preventing camera-shake blur of an image capturing apparatus including an electronic display unit.

REFERENCE SIGNS LIST

1 Image capturing apparatus
1My Motion
1y Exposure period
11 Optical system
12 Imaging device
13 Memory
14 Display unit
15 Motion detecting unit
16 Image generating unit
16a Image
17 Display control unit
18 Mechanical camera-shake blur correction unit
19 Electronic camera-shake blur correction unit
91 Motion trajectory
92 Guide line
101 Range where camera-shake blur correction is possible
111 Arrow

The invention claimed is:

1. An image capturing apparatus comprising:
an optical system;
an imaging device which converts light received by said optical system into display image data or captured image data to be output externally, and outputs the display image data or the captured image data;
a memory which stores the display image data or the captured image data;
a display unit configured to display a display image indicated by the display image data;
a motion detecting unit configured to detect motion information indicating a motion of said image capturing apparatus after the display image data is stored in said memory;
an image generating unit configured to generate a motion image indicating the motion of said image capturing apparatus which is indicated by the motion information; and
a display control unit configured to cause said display unit to display the motion image,
wherein said imaging device outputs the captured image data during an exposure period,
wherein said image generating unit is configured to generate, from the display image, a position-corrected image by shifting the display image indicated by the display image data according to the motion of said image capturing apparatus indicated by the motion information, the display image data being output by said imaging device prior to a start of the exposure period and being stored in said memory, and
wherein said display control unit is configured to cause said display unit to display the position-corrected image during the exposure period.

2. The image capturing apparatus according to claim 1, wherein said motion detecting unit is configured to detect a direction and an amount of the motion of said image capturing apparatus.

3. The image capturing apparatus according to claim 1, wherein the image data is output from said imaging device just prior to the start of the exposure period.

4. The image capturing apparatus according to claim 1, wherein the motion image indicates a degree of motion of said image capturing apparatus.

5. The image capturing apparatus according to claim 4, wherein the motion image indicates a trajectory of the motion of said image capturing apparatus.

6. The image capturing apparatus according to claim 4, wherein the motion image indicates the direction and the amount of the motion of said image capturing apparatus.

7. The image capturing apparatus according to claim 1, wherein said image generating unit is configured to generate a synthetic image by superimposing the motion image onto the position-corrected image, and
wherein said display control unit is configured to cause said display unit to display the generated synthetic image.

8. The image capturing apparatus according to claim 1, wherein said display control unit is configured to cause said display unit to display, during the exposure period, an enlarged image obtained by enlarging a portion of the position-corrected image generated by said image generating unit.

9. The image capturing apparatus according to claim 1,
wherein the exposure period is an exposure period in which exposure is started when a shutter button of said image capturing apparatus is pressed, and is a period equal to or longer than $1/3.75$ seconds,
wherein said imaging device is configured to generate a first image during a period prior to exposure, and not to generate the first image during the exposure period, the first image being to be displayed as a through image and indicating camera shake caused by a user holding said image capturing apparatus,
wherein said memory stores the first image generated during the period prior to exposure up to a given time in the exposure period,
wherein said motion detecting unit is configured to detect the motion of said image capturing apparatus, which is caused by the camera shake of the user during the exposure period, after the first image to be stored is generated,
wherein said image generating unit is configured to generate a second image by correcting a position in the stored first image, according to the detected motion, and
wherein said display unit is configured to display the camera shake during the period prior to exposure by displaying, during the period prior to exposure, the first image generated as the through image, and to display the camera shake during the exposure period by displaying, also during the exposure period, the second image generated by correcting the position.

10. The image capturing apparatus according to claim 9,
wherein said display unit is configured to simulatively display the through image also during the exposure period by displaying the second image during the exposure period.

11. The image capturing apparatus according to claim 10,
wherein the corrected position in the first image is a position corresponding to a motion remaining after a portion of the detected motion, which is corrected through mechanical camera-shake blur correction, is subtracted from the detected motion.

12. A display method performed by an image capturing apparatus including (i) an optical system, (ii) an imaging device which converts light received by the optical system into display image data or captured image data to be output externally, and outputs the display image data or the captured image data, (iii) a memory which stores the display image data or the captured image data, and (iv) a display unit which displays a display image indicated by the display image data, said display method comprising:
generating a motion image indicating a motion of the image capturing apparatus which is indicated by motion information that indicates the motion of the image capturing apparatus after the display image data is stored in the memory, the motion information being detected by a motion detecting unit included in the image capturing apparatus; and
causing the display unit to display the motion image,
wherein the imaging device outputs the captured image data during an exposure period, and
wherein said display method further comprises:
generating, from the display image, a position-corrected image by shifting the display image indicated by the display image data according to the motion of the image capturing apparatus indicated by the motion information, the display image data being output by the imaging device prior to a start of the exposure period and being stored in the memory; and causing the display unit to display the position-corrected image during the exposure period.

13. A non-transitory computer-readable recording medium for use in a computer in an image capturing apparatus including (i) an optical system, (ii) an imaging device which converts light received by the optical system into display image data or captured image data to be output externally, and outputs the display image data or the captured image data, (iii) a memory which stores the display image data or the captured image data, and (iv) a display unit which displays a display image indicated by the display image data, the non-transitory computer-readable recording medium having a computer program recorded thereon for causing the computer to execute a display method comprising:

generating a motion image indicating a motion of the image capturing apparatus which is indicated by motion information that indicates the motion of the image capturing apparatus after the display image data is stored in the memory, the motion information being detected by a motion detecting unit included in the image capturing apparatus; and causing the display unit to display the motion image, wherein the imaging device outputs the captured image data during an exposure period, and wherein said display method further comprises:

generating, from the display image, a position-corrected image by shifting the display image indicated by the display image data according to the motion of the image capturing apparatus indicated by the motion information, the display image data being output by the imaging device prior to a start of the exposure period and being stored in the memory; and causing the display unit to display the position-corrected image during the exposure period.

14. An integrated circuit provided in an image capturing apparatus including (i) an optical system, (ii) an imaging device which converts light received by the optical system into display image data or captured image data to be output externally, and outputs the display image data of the captured image data, (iii) a memory which stores the display image data or the captured image data, and (iv) a display unit which displays a display image indicated by the display image data, said integrated circuit comprising:

an image generating unit configured to generate a motion image indicating a motion of the image capturing apparatus which is indicated by motion information that indicates the motion of the image capturing apparatus after the display image data is stored in the memory, the motion information being detected by a motion detecting unit included in the motion capturing apparatus; and a display control unit configured to cause the display unit to display the motion image, wherein the imaging device outputs the captured image data during an exposure period, wherein said image generating unit is configured to generate, from the display image, a position-corrected image by shifting the display image indicated by the display image data according to the motion of the image capturing apparatus indicated by the motion information, the display image data being output by the imaging device prior to a start of the exposure period and being stored in the memory, and wherein said display control unit is configured to cause the display unit to display the position-corrected image during the exposure period.

* * * * *

UNITED STATES PATENT AND TRADEMARK OFFICE
CERTIFICATE OF CORRECTION

PATENT NO. : 8,823,812 B2  
APPLICATION NO. : 13/132656  
DATED : September 2, 2014  
INVENTOR(S) : Khang Nguyen et al.

Page 1 of 1

It is certified that error appears in the above-identified patent and that said Letters Patent is hereby corrected as shown below:

Title page item (73), Assignee, please replace "Panasonic Intellectual Property Corporation America" with -- Panasonic Intellectual Property Corporation of America --.

Signed and Sealed this
Twenty-third Day of December, 2014

Michelle K. Lee
*Deputy Director of the United States Patent and Trademark Office*